United States Patent [19]

Bennett et al.

[11] Patent Number: 5,734,317

[45] Date of Patent: Mar. 31, 1998

[54] CURRENT LIMIT CONTROLLER FOR AN AIR BAG DEPLOYMENT SYSTEM

[75] Inventors: Paul T. Bennett, Phoenix; Randall C. Gray, Tempe, both of Ariz.

[73] Assignee: Motorola, Inc., Schaumburg, Ill.

[21] Appl. No.: 674,067

[22] Filed: Jul. 1, 1996

[51] Int. Cl.$^6$ ........................................ B60Q 1/00
[52] U.S. Cl. .................. 340/436; 340/438; 280/734; 307/10.1
[58] Field of Search .................. 340/436, 438, 340/514; 280/734, 735; 180/271, 282; 307/10.1

[56] References Cited

U.S. PATENT DOCUMENTS

| | | | |
|---|---|---|---|
| 4,933,570 | 6/1990 | Swart | 340/436 |
| 5,101,192 | 3/1992 | Ishizuka | 340/436 |
| 5,155,376 | 10/1992 | Okano | 307/10.1 |
| 5,181,011 | 1/1993 | Okano | 340/438 |
| 5,194,755 | 3/1993 | Rhee et al. | 307/10.1 |
| 5,234,228 | 8/1993 | Morota t al. | 280/734 |
| 5,309,030 | 5/1994 | Schultz | 340/436 |
| 5,432,385 | 7/1995 | Kincaid et al. | 340/436 |
| 5,554,890 | 9/1996 | Kinoshita | 340/436 |

*Primary Examiner*—Brent A. Swarthout
*Assistant Examiner*—Van T. Trieu
*Attorney, Agent, or Firm*—Rennie William Dover

[57] ABSTRACT

An air bag deployment system (10) generates the proper current to activate a squib (74) and deploy an air bag. A separate capacitor (48) powers circuitry in a drive limit controller (54) for providing a variable voltage drive to a MOS device (68) to regulate squib (74) firing current. A switch circuit (38) supplies gate current to a transistor (46) such that an electrical connecting path allows a capacitor (22) to charge a capacitor (48). During squib (74) firing and air bag deployment, the switch circuit (38) provides electrical isolation between the decaying voltage stored on the capacitor (22) that powers the squib (74) current and the capacitor (48) that provides current regulation to the squib (74) from the drive limit controller (54).

17 Claims, 2 Drawing Sheets

CURRENT LIMIT CONTROLLER FOR AN AIR BAG DEPLOYMENT SYSTEM

BACKGROUND OF THE INVENTION

The present invention relates, in general, to integrated circuit devices and, more particularly, to a semiconductor circuit for activating air bag deployment.

The air bag deployment system for automotive vehicles generally employs an accelerometer as the sensor that is sensitive to vehicle motion, especially deceleration. The vehicle battery or ignition system voltage powers the deployment circuit and the firing circuit. The deployment circuit and the firing circuit are to a large extent controlled by a microprocessor on an integrated circuit chip that monitors the accelerometer, but an external harness leads to a squib at the site of each air bag. The squib is a wire that is heated for igniting explosive material that causes the air bag to inflate.

Firing of the squib typically requires a pair of Field Effect Transistors (FETs) conducting current, one on each side of the squib. Charge pumps are used to boost the voltage for the firing circuits above that supplied by the vehicle battery. Charged capacitors can be used to supply power to the electronics if the vehicle battery becomes disconnected or damaged during a crash event.

To forestall the possibility that an inadvertent electrical connection to the firing circuit might cause deployment of the air bag or disable the system, it is desirable to monitor the system to preclude any such event. During normal vehicle operating conditions the air bag deployment system provides continuous diagnostic checks. One such diagnostic check monitors the resistivity parameter of the squib and another monitors the generated voltage of about twenty-four volts on a charged boost storage capacitor that stores the energy to fire the squib. Also, to assure readiness of the firing circuit to fire, it is desirable to test the FETs (and their drive circuits) for operability.

When the accelerometer records a reading that the microprocessor interprets as a crash event, the microprocessor supplies the pair of FETs with a conduction current for firing the squib. The energy to initiate and sustain the firing comes from the generated voltage on the charged boost storage capacitor. Typically, the boost storage capacitor drops to about ten volts as the specified firing current is supplied to the squib. The charge pump actively tries to boost the voltage and replenish the charge dissipated by the squib.

It would be desirable to have an improved circuit to generate the proper current to activate the squib and deploy the air bag. The circuitry generating the squib firing current should provide a constant current for approximately two milliseconds while the air bag is deployed and provide monitoring for diagnostic checks to assure readiness to fire and operability.

DETAILED DESCRIPTION OF THE DRAWINGS

Figure 1:
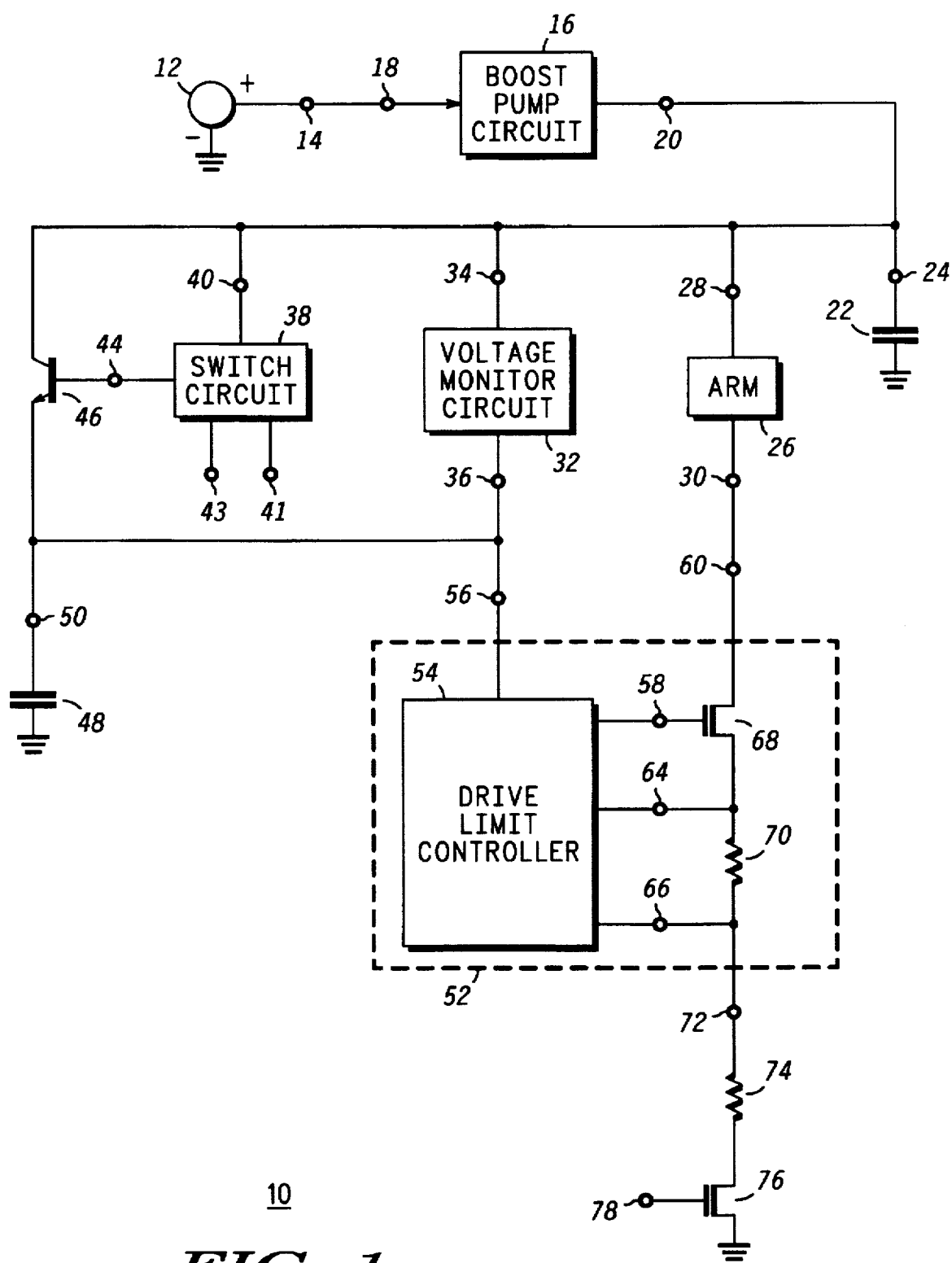
FIG. 1 illustrates in partial block form and partial schematic form, a portion of an air bag deployment system in accordance with an embodiment of the present invention.

FIG. 1 is a block diagram of a portion of an air bag deployment system 10 in accordance with an embodiment of the present invention. A battery 12 provides a positive voltage of about twelve to fourteen volts at terminal 14 in the preferred embodiment. The negative terminal of battery 12 is connected to ground. Input terminal 18 of boost pump circuit 16 receives the voltage of about twelve to fourteen volts and provides a voltage of about twenty-four volts at output terminal 20. A capacitor 22 with a value in the range of five-hundred microfarads (µf) to ten-thousand microfarads is connected between terminal 24 and ground. Terminal 24 receives a boost voltage generated by boost pump circuit 16 at terminal 20 and stores that boost voltage on capacitor 22 (the opposite side of which is coupled to electrical ground).

Terminal 28 of mechanical arm 26, terminal 34 of voltage monitor 32, terminal 40 of switch circuit 38 and the collector of NPN transistor 46 are connected to terminal 20 of boost pump circuit 16. Transistor 46 is a three-terminal semiconductor device with a base, a collector as a conducting electrode, and an emitter as a conducting electrode. Terminal 36 of voltage monitor 32 and terminal 50 of capacitor 48 are connected to the emitter of transistor 46. Capacitor 48, with a value of about 0.1 µf in the preferred embodiment, is connected between terminal 50 and ground. Terminal 44 of switch circuit 38 is connected to the base of transistor 46. Terminal 41 of switch circuit 38 is coupled for receiving a diagnostic check signal DISABLE. Terminal 43 of switch circuit 38 is coupled for receiving a signal NBIAS.

High side current circuit 52 of FIG. 1 comprises drive limit controller 54, N-channel Metal Oxide Semiconductor (MOS) device 68, and resistor 70. Terminal 56 of drive limit controller 54 is coupled to terminal 50 for receiving a Charged Gate Drive (CGD) voltage of about twenty to thirty volts in the preferred embodiment. Terminal 58 of drive limit controller 54 provides a variable voltage output to the gate of MOS device 68 when the air bag is deployed. The drain of MOS device 68 is connected to output terminal 60 of high side current circuit 52. Terminal 60 receives a voltage from terminal 30 of mechanical arm 26 that indicates the air bag should be deployed. Resistor 70 is connected across terminals 64 and 66 of drive limit controller 54 and in series with MOS device 68. The source of MOS device 68 is coupled to terminal 64. Terminal 66 of drive limit controller 54 is connected to terminal 72 of high side current circuit 52.

Squib 74 is a low resistive wire with a first terminal connected to terminal 72 of high side current circuit 52. The second terminal of squib 74 is connected to the drain of MOS device 76. The gate of MOS device 76 is connected to terminal 78 and the source of MOS device 76 is connected to ground. When squib 74 is fired, i.e. the squib is conducting about 2.1 amps of current, MOS device 68 as the high side FET and MOS device 76 as the low side FET are switched on for conducting the squib current. Future industry trends are for currents less than the 2.1 amps as the firing current to the squib.

Figure 2:
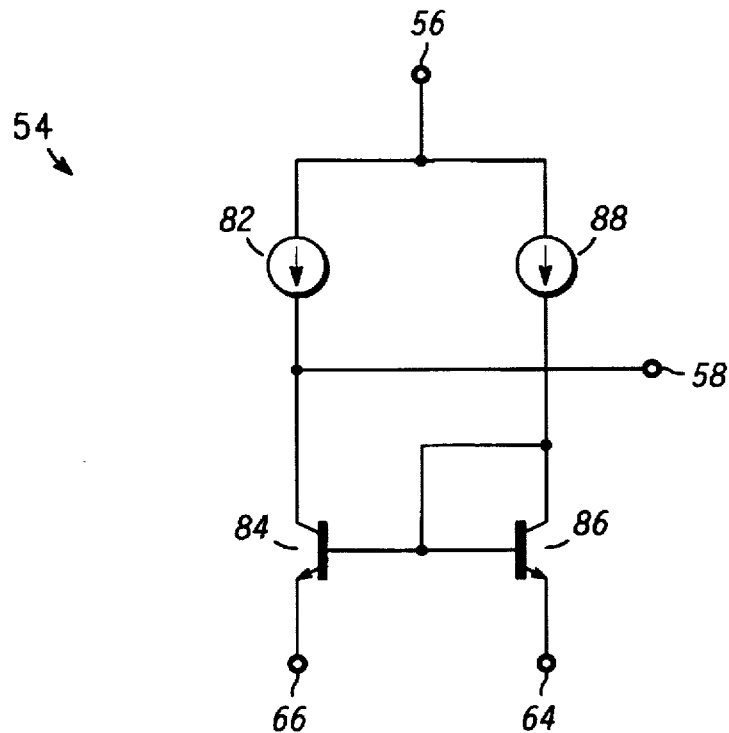
FIG. 2 is a schematic diagram of a simplified embodiment for a drive limit controller shown in FIG. 1.

FIG. 2 is a schematic diagram of an embodiment for drive limit controller 54 shown in FIG. 1. A current source 82 is connected between terminal 56 and the collector of NPN transistor 84. A current source 88 is connected between terminal 56 and the collector of NPN transistor 86. The common bases of the transistors 84 and 86 are connected to the collector of transistor 86, thus forming a current mirror for transistors 84 and 86. The emitter of transistor 84 and the emitter of transistor 86 are connected to terminals 66 and 64, respectfully, of drive limit controller 54. In an alternate embodiment drive limit controller 54 could be a current source connected between terminal 56 and terminal 58 should current limiting not be required for MOS device 68 during air bag deployment.

Figure 3:
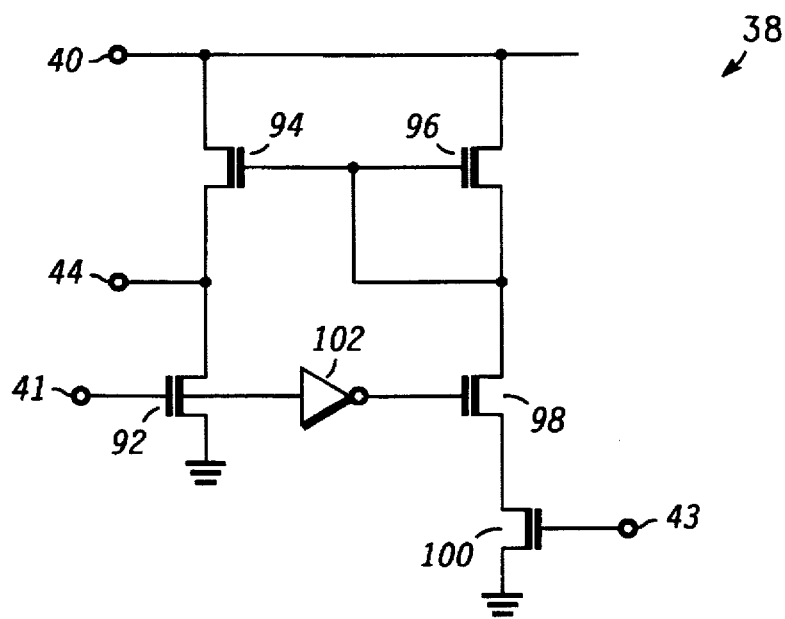
FIG. 3 is a schematic diagram of a switch circuit for the air bag deployment system shown in FIG. 1.

FIG. 3 is a schematic diagram of switch circuit 38 for the air bag deployment system shown in FIG. 1. The gate of N-channel MOS device 92 is connected to terminal 41. Terminal 41 receives a signal DISABLE for diagnostic purposes. MOS device 92 has the source connected to ground and the drain connected to the source of MOS device 94, forming a node for terminal 44. Terminal 44 is coupled for providing a signal to the base of transistor 46 (see FIG. 1). The common gates of P-channel MOS devices 94 and 96 are connected to the drain of MOS device 96. The sources for both MOS devices 94 and 96 are connected to terminal 40. The drain of N-channel MOS device 98 is connected to the drain of MOS device 96. The source of MOS device 98 is connected to the drain of N-channel MOS device 100. The source of MOS device 100 is connected to ground and the gate is connected to terminal 43. Inverter 102 has an input and an output, with the input connected to terminal 41 and the output connected to the gate of MOS device 98.

In operation, the embodiment shown in FIG. 1 of an air bag deployment system 10 sets a current limit and regulates that current into squib 74 when deployment is initiated. The vehicle battery 12 provides a voltage of about twelve to fourteen volts that is increased to about twenty to thirty volts by boost pump circuit 16. Capacitor 22 stores the boosted charge for supplying the current of about 2.1 amps to fire squib 74 when the air bag (not shown) is to be deployed. The deployment of the air bag is typically in response to an accelerometer output monitored by a microprocessor (not shown) for evaluating the deceleration and determining if a crash has occurred. Mechanical arm 26 safeguards the possibility that an inadvertent electrical connection could fire and cause deployment of the air bag.

To initiate the air bag deployment, both high side MOS device 68 and low side MOS device 76 conduct current through the current path activated by the closing of mechanical arm 26. In particular, current from capacitor 22 flows through mechanical arm 26, high side MOS device 68, resistor 70, squib 74, low side MOS device 76, and into ground.

High side current circuit 52 shown in FIG. 1 is powered by the electrically stored charge on capacitor 48. Resistor 70 monitors the current of about 2.1 amps conducting through squib 74 for modulating the gate voltage of MOS device 68. Drive limit controller 54 provides a variable gate voltage of about eighteen volts to high side MOS device 68, such that MOS device 68 functions as a current source in maintaining a relatively constant current of about 2.1 amps to squib 74 in the preferred embodiment. The embodiment shown in FIG. 2 for drive limit controller 54 provides a current source 82 with a current of about eight microamps into the collector of transistor 84. Current source 88 provides a current of about one microamp into the collector of transistor 86. A voltage of about fifty-six millivolts appears across terminals 64 and 66 in accordance with the squib firing current of about 2.1 amps through resistor 70 (see FIG. 1). The current limit to squib 74 is provided in accordance with the following equation in the preferred embodiment:

$$I(lim) = 26\ millivolts * \ln(I82/I88)/V(R70)$$

where I82 is the current supplied by current source 82, I88 is the current supplied by current source 88, and V(R70) is the voltage across resistor 70 at terminals 64 and 66.

Thus, in accordance with a ratio of currents supplied by the current sources 82 and 88 and the voltage across resistor 70, a voltage is provided from the drain of transistor 84 to the gate of MOS device 68 for regulating the drain-to-source conduction current of power MOS device 68 at about 2.1 amps in the preferred embodiment. The voltage across resistor 70 summed with the base-emitter voltage (Vbe) for transistor 86 matches the Vbe for transistor 84 in the current mirror when in current regulation.

For instance, when the conduction current of MOS device 68 changes about a value, such as 2.0 amps, the current change in serially connected resistor 70 causes a voltage change across resistor 70. An increased current will increase the voltage at terminal 64 which when combined with the Vbe for transistor 86 provides for an increased Vbe for transistor 84. The voltage at the collector of transistor 84 decreases in accordance with the increased Vbe for transistor 84. The gate of MOS device 68 is connected to the collector of transistor 84, thus decreasing the gate-to-source voltage of MOS device 68. Therefore, an increasing conduction current above the 2.0 amps value in MOS device 68 is sensed in resistor 70 and the current mirror transistor 84 in drive limit controller 54 provides a decreasing gate voltage to MOS device 68, thus regulating the squib current to a value of about 2.0 amps.

In the preferred embodiment, current sources 82 and 88 are supplied at terminal 56 with current stored in capacitor 48 (see FIG. 1) while squib 74 is supplied with current stored in capacitor 22. During squib deployment, capacitor 48 provides about one microamp of current to current source 88 and about eight microamps of current to current source 82 while capacitor 22 provides a current of about 2.1 amps to squib 74. For example, the separate storage capacitor 48 maintains a voltage in the range of eighteen to twenty four volts during deployment of the air bag compared with the voltage on capacitor 22 starting at about twenty-four volts and dropping to about ten volts. Thus, providing a separate capacitor 48 for supplying energy to drive limit controller 54 allows for the generation of a voltage for driving the gate of MOS device 68 such that a relatively constant current of about 2.1 amps is maintained for squib 74 during air bag deployment.

As part of the embodiment shown in FIG. 1, capacitor 22 connected at terminal 24 is coupled to capacitor 48 connected at terminal 50 through NPN transistor 46. Thus, during normal operation or standby, switch circuit 38 keeps transistor 46 conducting current such that the gate drive capacitor 48 is charged to about the same voltage as capacitor 22, i.e. twenty-four volts. Diagnostic checks disable the charging of capacitor 48 from capacitor 22 through transistor 46, or generate an isolation path of capacitor 48 from capacitor 22. While isolated, the voltage across capacitor 48 can be monitored to be above a minimal value of about 18 volts. The voltage across capacitor 48 remains relatively constant during the two milliseconds of time for air bag deployment in accordance with the small currents supplied from capacitor 48 to drive limit controller 54. During air bag deployment transistor 46 becomes reverse biased, thus blocking a conductive path between capacitors 22 and 48.

An alternate embodiment for air bag deployment system 10, as shown in FIG. 1, would replace transistor 46 with a PN-diode (not shown) and also functionally eliminate switch circuit 38. In particular, the PN-diode would be connected such that the P-side of the diode is connected to terminal 24 and the N-side of the diode is connected to terminal 50. In this embodiment, the diode is forward biased during normal operation and capacitor 48 is charged by capacitor 22. During the firing of squib 74, capacitor 22 discharges such that the diode becomes reversed biased.

Switch circuit 38 in FIG. 3 functions in the following way. When the input signal DISABLE at terminal 41 is high, MOS device 92 is conducting such that the voltage at terminal 44 is about zero volts. A gate voltage with the value of zero volts turns off transistor 46 (see FIG. 1), thus preventing an electrical conduction path between capacitor 22 and capacitor 48. The input signal DISABLE is high during diagnostic checks for determining the voltages on capacitors 22 and 48.

When the input signal DISABLE is low, MOS devices 96, 98, and 100 connected serially are conducting about twenty-five microamps of current. MOS device 94 is sized with a channel width about twenty times greater than the channel width for MOS device 96 in the preferred embodiment, such that MOS device 94 is conducting about four-hundred microamps of current. The approximate four-hundred microamps of current supplied by MOS device 94 is the base current into terminal 44 such that transistor 46 (see FIG. 1) provides the electrical conduction path allowing capacitor 48 to be charged from capacitor 22. In standby or normal operation, capacitor 48 is charged to a voltage of about twenty to thirty volts in preparation for the discharge of the air bag.

By now it should be appreciated that the present invention for air bag deployment system 10 generates the proper current to activate squib 74 and deploy the air bag. A capacitor 48, separate from capacitor 22 that supplies energy for firing the squib, powers circuitry in drive limit controller 54 providing a variable voltage drive to MOS device 68 for regulating current at about 2.1 amps for firing the squib. Switch circuit 38 supplies gate current to transistor 46 such that an electrical connecting path allows capacitor 22 to charge capacitor 48. The charge stored on capacitor 48 is monitored through diagnostic checks to assure readiness to fire and operability. Switch circuit 38 also provides electrical isolation between capacitors 22 and 48 such that the voltage to drive limit controller 54 remains above eighteen volts during air bag deployment. An integrated circuit suitable for manufacture can be built to include boost pump circuit 16, voltage monitor 32, switch circuit 38, transistor 46, and drive limit controller 54.

While specific embodiments of the present invention have been shown and described, further modifications and improvements will occur to those skilled in the art. For instance, one embodiment has capacitors 22 and 48 supplying two loops of high side current circuit 52 for potentially firing two squibs 74 and deploying two air bags. However, air bag deployment system 10 could power high side current circuit 52 in a single loop system and fire a single squib 74 and deploy a single air bag. Also, squib firing currents below the 2.1 amps are anticipated.

What is claimed is:

1. An air bag deployment system, comprising:
  a switch circuit having a first terminal and a second terminal;
  a transistor having a base terminal coupled to the first terminal of the switch circuit, a collector terminal coupled to the second terminal of the switch circuit for receiving a first energy, and an emitter terminal for receiving a second energy;
  a drive limit controller having a voltage terminal coupled to the emitter terminal of the transistor, a first input terminal, a second input terminal, and an output; and
  a transistor having a gate coupled to the output of the drive limit controller, a drain terminal coupled to the second terminal of the switch circuit, and a source terminal that provides the first energy as a deployment energy in the air bag deployment system.

2. The air bag deployment system of claim 1 wherein the switch circuit controls the transistor to provide an isolation path during squib firing, the isolation path being from the first conducting electrode to the second conducting electrode of the transistor when the transistor is nonconducting.

3. The air bag deployment system of claim 1 wherein the switch circuit controls the transistor to provide an isolation path during diagnostics, the isolation path being from the first conducting electrode to the second conducting electrode of the transistor when the transistor is nonconducting.

4. The air bag deployment system of claim 1 further comprising a semiconductor device and a resistor coupled in series and each separately coupled to the drive limit controller.

5. The air bag deployment system of claim 4 wherein the resistor provides a voltage change in accordance with a current change in the semiconductor device, and
  the drive limit controller provides a voltage to a gate of the semiconductor device in response to the voltage change.

6. The air bag deployment system of claim 1, further comprising a resistor having a first terminal and a second terminal, wherein the first terminal of the resistor is coupled to the source terminal of the metal oxide semiconductor transistor and to the first input terminal of the drive limit controller, and the second terminal of the resistor is coupled to the second input terminal of the drive limit controller.

7. The air bag deployment system of claim 1, further comprising a first capacitor having a first terminal coupled to the collector terminal of the transistor and a second capacitor having a first terminal coupled to the emitter terminal of the transistor.

8. The air bag deployment system of claim 7 wherein the first capacitor stores energy for firing a squib.

9. The air bag deployment system of claim 7 wherein the second capacitor provides a voltage for the drive limit controller.

10. An electrical conduction path for an air bag deployment system, comprising:
  a switch circuit having a first terminal for receiving a first stored energy and a second terminal for receiving a second stored energy; and
  a transistor having a control electrode coupled to the first terminal of the switch circuit, and a current conducting electrode coupled to the second terminal of the switch circuit, wherein the transistor provides an electrical conduction path controlled by the switch circuit, the transistor being off during deployment of an air bag for separating the first stored energy from the second stored energy.

11. The electrical conduction path of claim 10 further comprising a first capacitor and a second capacitor, wherein the transistor couples the first capacitor to the second capacitor.

12. The electrical conduction path of claim 11 wherein the second capacitor charges the first capacitor through the transistor.

13. The electrical conduction path of claim 12 further comprising a squib, wherein the squib receives charge from the second capacitor.

14. The electrical conduction path of claim 12 further comprising a drive limit controller, wherein the drive limit controller receives charge from the first capacitor.

15. The electrical conduction path of claim 11 wherein the transistor isolates the first capacitor from the second capacitor during a diagnostics check.

16. An integrated circuit for air bag deployment, comprising:

a transistor having a control electrode and a first and a second conducting electrode;

a switch circuit having a first terminal coupled to the control electrode of the transistor and a second terminal coupled to the first conducting electrode of the transistor; and a high side current circuit having a first input and a second input, wherein the first input of the high side current circuit is coupled to the first conducting electrode of the transistor and the second input of the high side current circuit is coupled to the second conducting electrode of the transistor, and the transistor isolates the first input from the second input of the high side current circuit when the second terminal of the switch circuit receives a signal for air bag deployment.

17. The integrated circuit of claim 16, further comprising a first capacitor coupled to the first conducting electrode and a second capacitor coupled to the second conducting electrode.

* * * * *